United States Patent [19]

Covington et al.

[11] 4,257,739

[45] Mar. 24, 1981

[54] SOFT INPLANE HELICOPTER ROTOR

[75] Inventors: Cecil E. Covington, Hurst; David E. Snyder, Arlington; Walter G. Sonneborn; Wesley L. Cresap, both of Fort Worth, all of Tex.

[73] Assignee: Textron, Inc., Providence, R.I.

[21] Appl. No.: 941,255

[22] Filed: Sep. 11, 1978

[51] Int. Cl.³ .............................................. B64C 27/38
[52] U.S. Cl. ............................... 416/134 A; 416/140; 416/141
[58] Field of Search .......... 416/134 A, 138 A, 140 A, 416/141

[56] References Cited

U.S. PATENT DOCUMENTS

| 3,026,942 | 3/1962 | Cresap | 416/138 A X |
|---|---|---|---|
| 3,347,320 | 10/1967 | Cresap et al. | 416/102 X |
| 3,652,185 | 3/1972 | Cresap | 416/134 A |
| 3,926,536 | 12/1975 | Ciastula et al. | 416/138 A X |
| 3,942,910 | 3/1976 | Snyder et al. | 416/141 |
| 3,967,918 | 7/1976 | Mouille et al. | 416/134 A X |
| 4,012,169 | 3/1977 | Mouille et al. | 416/134 A |
| 4,028,002 | 6/1977 | Finney et al. | 416/134 A |
| 4,099,892 | 7/1978 | Martin | 416/134 A |
| 4,129,403 | 12/1978 | Watson | 416/134 A |
| 4,135,856 | 1/1979 | McGuire | 416/134 A |

FOREIGN PATENT DOCUMENTS 2754379  7/1978  Fed. Rep. of Germany ...... 416/134 A

*Primary Examiner*—Everette A. Powell, Jr.

[57] ABSTRACT

A helicopter rotor hub assembly (10) in which a blade grip (30) extends inboard of a yoke (14) and transfers centrifugal forces to the yoke (14) through a spherical elastomeric bearing (38). Pitch change of the grip (30) and blade (32) is accommodated by the spherical elastomeric bearing (38) which also acts as the pivot point for lead-lag motion of the blade (32) and grip (30). A lead-lag damper (22) is located inboard of the elastomeric bearing (38) and is connected between one end of the grip (30) spaced away from the lead-lag pivot and the yoke (14) for damping the lead-lag motion between the grip (30) and yoke (14).

14 Claims, 4 Drawing Figures

SOFT INPLANE HELICOPTER ROTOR

TECHNICAL FIELD

The present invention pertains to rotary winged aircraft and more particularly to a rotor-hub assembly for connecting the rotor blades to the mast.

BACKGROUND ART

Elastomeric bearings have previously been utilized to replace metal-to-metal bearings in a helicopter rotor-hub to reduce mechanical wear and failure as shown in U.S. Pat. No. 3,652,185 to Cresap et al. However, there exists a need for a rotor-hub which incorporates elastomeric bearings to accommodate lead-lag and pitch motion of rotor blades while at the same time damping the lead-lag oscillation of the rotor blades.

SUMMARY OF THE INVENTION

A helicopter blade-yoke coupling comprises a blade grip secured to the blade and extending inboard of the end of a yoke and an elastomeric blade retention bearing mounted between the inboard portion of the grip and the outer part of the yoke for transfering centrifugal forces from the blade to the yoke while accommodating blade pitch changes and lead-lag motion. Further, a soft inplane coupling is placed inboard of the blade retention bearing and between the yoke and the inboard portion of the grip to permit blade pitch motion and lead-lag pivotal motion about the retention bearing while reacting the out-of-plane loads and providing damping for the lead-lag oscillation of the blade.

BRIEF DESCRIPTION OF DRAWINGS

For a more complete understanding of the present invention and for further objects and advantages thereof, reference is now had to the following description taken in conjunction with the accompanying drawings in which.

DETAILED DESCRIPTION

Figure 1:
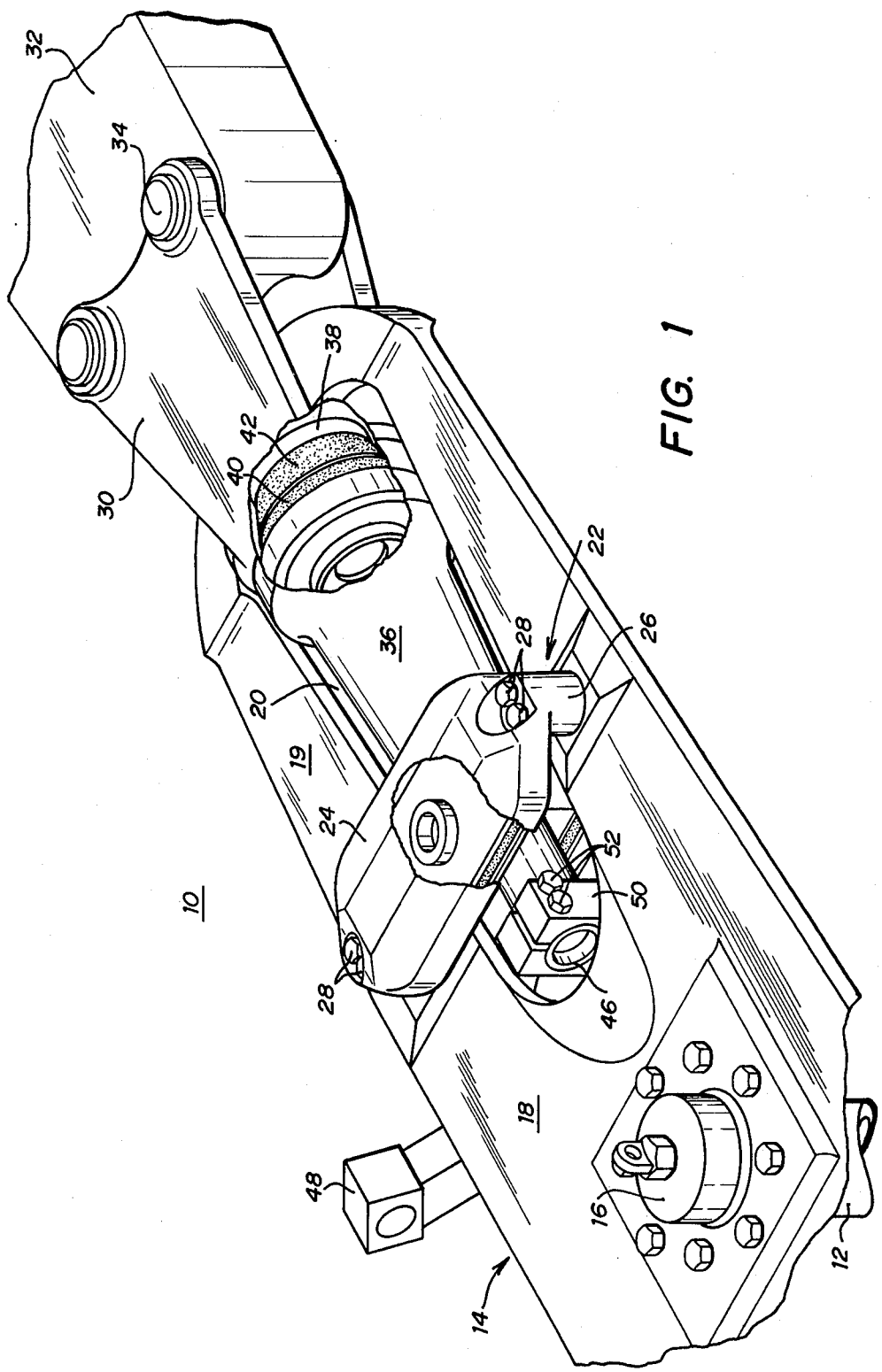
FIG. 1 is a partially cut away perspective view showing a helicopter rotor hub assembly.

FIG. 1 illustrates a rotor-hub assembly 10 in accordance with the present invention. A rotor mast 12 of a helicopter (not shown) supports a yoke 14 by means of a connecting mast nut 16. Yoke 14 includes an integral flapping flexure having an inboard segment 18 and an outboard segment 19. Within the yoke 14 there is an interior opening 20 which extends through the flapping flexure and longitudinally along the yoke.

A lead-lag damper 22 is connected to the yoke 14 in the region of the flexure segments 18 and 19 while crossing the interior opening 20. The damper 22 includes a damper bridge 24 supported by damper columns 26 which are in turn affixed to the yoke 14 by means of bolts 28.

A blade grip 30 in the form of a forked member is connected to a blade 32 by means of blade bolts 34. A spindle 36 which is an integral part of blade grip 30 is disposed within the interior opening 20 of the yoke 14.

Blade grip 30 transfers the centrifugal forces of the blade to the yoke 14 through blade retention bearing 38. There is included in the blade retention bearing 38 a spherical elastomeric member 40 which accommodates lead-lag motion and part of the blade pitch change motion, and a conical elastomeric member 42 which permits the remainder of the blade's rotation about its pitch axis in relation to the yoke 14.

At the inboard end of the spindle 36 is a trunnion 46 which passes through the lead-lag damper 22. A pitch horn 48 has a clamp section 50 which is connected to the trunnion 46 by means of bolts 52.

Figure 2:
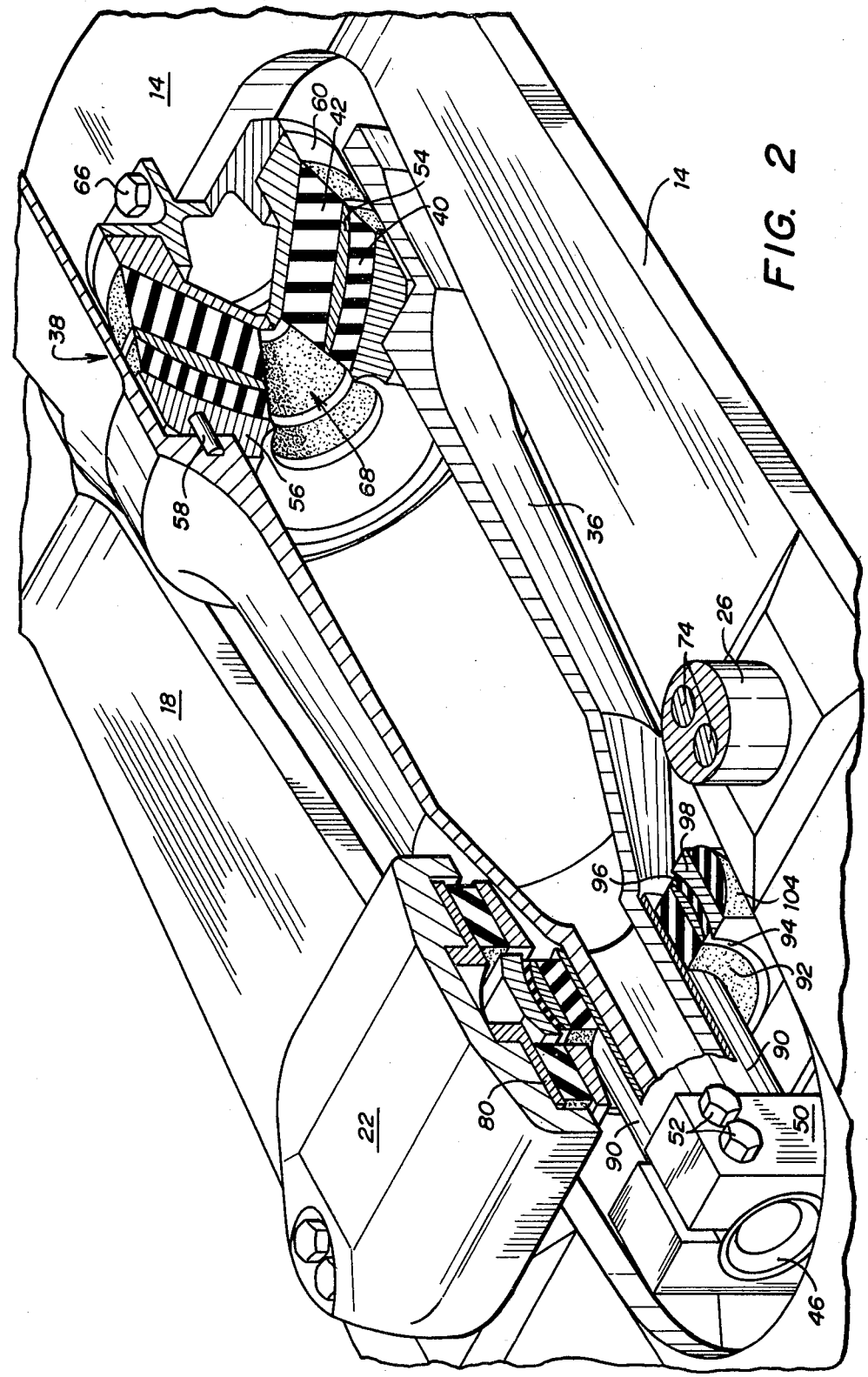
FIG. 2 is a partially sectioned perspective view of the rotor hub assembly shown in FIG. 1.
Figure 3:
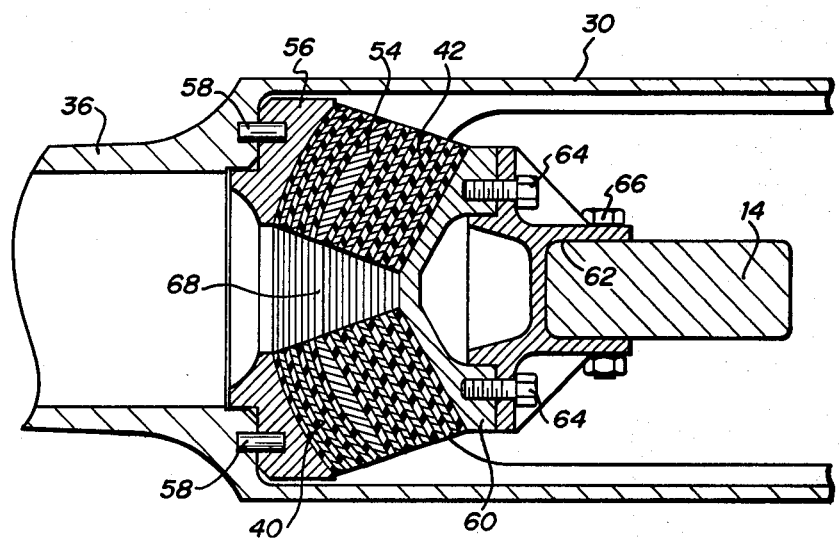
FIG. 3 is a sectional view taken along lines 3—3 of FIG. 1 of a helicopter rotor lead-lag hinge.

The blade retention bearing 38 is illustrated in greater detail in FIGS. 2 and 3. Spherical elastomeric member 40 is separated from conical elastomeric member 42 by a bearing washer 54 which has a spherical surface on the side facing the spherical elastomeric member 40 and a conical surface of the side facing the conical elastomeric member 42. A spherical bearing plate 56 is bonded to the spherical elastomeric member 40 along its spherical inner surface and is connected by pins 58 to the spindle 36. The outboard face of the conical elastomeric member 42 is bonded to a conical bearing plate 60 which is connected to a bearing adapter fitting 62 by bolts 64. A pair of bolts 66 connect bearing adapter fitting 62 to the yoke 14. A conical hole 68 passes through the spherical bearing plate 56, spherical elastomeric member 40, bearing washer 54, conical elastomeric member 42 and the conical bearing plate 60. This hole provides space to allow for deformation of the elastomeric members.

Figure 4:
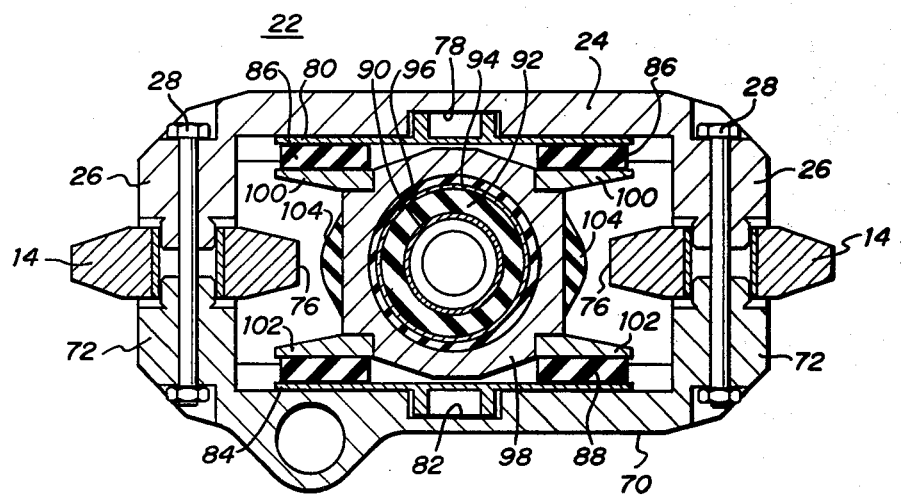
FIG. 4 is a sectional view taken along lines 4—4 of FIG. 1 of a helicopter rotor lead-lag damper.

Lead-lag damper 22 is shown in greater detail in FIGS. 2 and 4. The damper bridge 24 extends across the upper surface of the yoke 14 and is supported by the damper columns 26. On the under surface of the yoke 14 a damper bridge 70 extends across the interior opening 20 and is supported by damper columns 72. The damper columns 26 and 72 along with the damper bridges 24 and 70 are clamped together onto the yoke 14 and held in place by means of bolts 28. The yoke 14 includes yoke stop members 76 which extend into the interior of the lead-lag damper 22.

The damper bridge 24 includes a longitudinal slot 78 into which is fitted an interface plate 80 which also covers a portion of the lower face of the damper bridge 24. The damper bridge 70 on the underside of the yoke 14 likewise has a slot 82 with an interface plate 84 disposed adjacent thereto. An upper damper pad 86 is bonded to the interface plate 80. A lower damper pad 88 is likewise bonded to the interface plate 84.

A sleeve 90 is fitted around the trunnion 46 within the lead-lag damper 22. A cylindrical elastomeric element 92 is bonded to the outer surface of the sleeve 90 and to an elastomeric bearing washer 94. Bonded to the outer surface of the elastomeric bearing washer 94 is a spherical section elastomeric member 96 which is bonded on its outer surface to a bearing case 98. The elastomeric bearing washer 94 has a cylindrical inner surface and a spherical outer surface mating with the respective elastomeric members. In addition, the bearing case 98 has a spherical inner surface which receives the spherical section elastomeric member 96.

A bonding plate 100 is joined to the bearing case 98 on its upper side and the bonding plate is itself bonded to the damper pad 86. Likewise, a bonding plate 102 is joined to the lower region of the bearing case 98 and is bonded to the damper pad 88.

On each transverse side of the bearing case 98 are elastomeric lag stops 104 which are aligned to meet the yoke stops 76. These stops prevent the spindle 36 and trunnion 46 from undergoing excessive transverse travel and damaging the lead-lag damper 22.

Operation of the rotor hub 10 is now described in reference to FIGS. 1–4. The rotor hub assembly 10 provides an apparatus for conveying the centrifugal forces generated by the blade 32 to the mast 12. In addition the assembly 10 provides pitch control for selecting the desired pitch of the blade, lead-lag motion of the blade about the blade retention bearing 38, damping of the lead-lag motion of the blade, and the necessary flapping action for the rotor blades.

The centrifugal forces generated by the blade 32 are transmitted from the grip 30 to the yoke 14 through the blade retention bearing 38. Referring specifically to FIGS. 2 and 3, the grip 30 transfers the centrifugal force to the spherical bearing plate 56 which compresses the elastomeric members 40 and 42 against the conical bearing plate 60. The yoke 14 is rigidly connected to the bearing plate 60 through the bearing adapter fitting 62, therefore, the yoke 14 receives the centrifugal forces generated by the blade 32. The yoke itself is rigidly connected to the mast 12.

The blade 32 pivots in its lead-lag motion about the blade retention bearing 38. This lead-lag action results in a shear force which is carried by the spherical elastomeric member 40 and conical elastomeric member 42. The necessary space for deformation is provided within the grip 30 along the interior surface thereof and within the conical hole 68. Spherical elastomeric member 40 and conical elastomeric member 42 deflect in shear between the spherical bearing plate 56 and the bearing washer 54, the elastomeric members being bonded to each of these metallic members.

The pitch horn 48 is driven by the helicopter control system to rotate the spindle 36 and grip 30 about the blade pitch axis to set the blade 32 to the desired pitch. The pitch motion of the grip 30 relative to the yoke 14 is accommodated by elastomeric members 40 and 42. Both of the members 40 and 42 react in torsional shear between the plates 56 and 60 to accommodate the motion.

In order to control movement of the blade 32 in its lead-lag oscillation and to reduce the natural frequency of this oscillation, it is necessary to provide damping to react to the movement of the blade about the pivot point within the lag hinge 38. This damping is provided by the lead-lag damper 22, which is described more specifically in reference to FIGS. 2 and 4. The spindle 36 narrows to the trunnion 46 on the inboard side, the trunnion passing through the lead-lag damper 22 and extending to the pitch horn clamp 50. Within the damper 22 the trunnion 46 is joined to a sleeve 90 which is bonded to the cylindrical elastomeric member 92. Rotation of the trunnion 46 about the pitch axis of the blade 32 is permitted by shear of the elastomeric members 92 and 96. These members are each bonded to the elastomeric bonding washer 94 and the spherical section elastomeric member 96 is bonded to the bearing case 98. Thus, rotation of the trunnion 46 produces a shear force on the elastomeric members 92 and 96. These members allow the shaft to rotate when driven by the helicopter control systems.

The basic lead-lag damping provided by the damper 22 is due to the damper pads 86 and 88. These pads are connected between the bonding plates 100 and 102 of the bearing case 98 and the interface plates 80 and 84 which are respectively connected to the damper bridges 24 and 70. As the blade 32 pivots about the lag hinge 38, the bearing case 98 is caused to move transversely thus applying shear forces to the damper pads 86 and 88. These elastomeric pads respond by forcing the bearing case 98 back to its central location after the elastomer lag force is applied. These damper pads are made from an elastomer having visco-elastic characteristics. Under oscillating shear motion, the visco-elastic material exhibits hysteresis which will damp the oscillation of the blade about the pivot point within the blade retention bearing 38.

Under certain conditions the blade 32 is caused to travel excessively within the plane of the rotor disc. This excessive motion is absorbed by the impact of the elastomeric lag stops 104 against the yoke stops 76 within the lead-lag damper 22. These lag stops are disposed on either side of the bearing case 98 to absorb excessive movement in either direction by the blade 32.

The elastomeric members described above comprise alternating layers of an elastomer such as natural rubber or BTR IV manufactured by Lord Kinematics and layers of a metal such as steel or stainless steel. A typical thickness for the elastomeric layers is 0.040 inch while the metal layers have a typical thickness of 0.025 inch. The elastomeric and metal layers are bonded together.

Although one embodiment of the invention has been illustrated in the accompanying drawings and described in the foregoing detailed description, it will be understood that the invention is not limited to the embodiment disclosed, but is capable of numerous rearrangements, modifications and substitutions without departing from the scope of the invention.

We claim:

1. In a helicopter blade-yoke coupling, the combination comprising:
   a blade grip secured to said blade and extending inboard of the end of said yoke,
   an elastomeric retention bearing mounted between said blade grip and said yoke to transfer centrifugal forces from said blade to said yoke while accommodating blade pitch changes and blade lead-lag in a plane about said elastomeric bearing,
   a soft inplane, rigid out-of-plane coupling inboard of said elastomeric bearing between one end of said blade grip and said yoke to permit blade lead-lag motion and pitch change while damping movement of said blade grip relative to said yoke, and
   a beam-wise flexible plate inboard of said soft inplane coupling and forming part of said yoke to accommodate blade flapping independently of said soft inplane coupling.

2. The combination set forth in claim 1 in which the portion of said yoke extending between said elastomeric bearing and said soft inplane coupling is of a flexible plate character to permit the flexure flapwise of said yoke between said elastomeric bearing and said soft inplane coupling.

3. The combination set forth in claim 1 wherein said soft inplane coupling comprises an elastomeric pad for absorbing lead-lag shear forces between said grip and said yoke.

4. The combination set forth in claim 1 wherein said elastomeric bearing includes a cylindrical elastomeric element for accommodating pitch change of said blade grip and a spherical elastomeric element for carrying the centrifugal force of said blade.

5. In a helicopter rotor, a coupling for joining a blade to a mast while accommodating blade pitch change, lead-lag motion and flapping, the combination comprising, a flat yoke with an elongate slot therein, a spindle having a forked outboard end opposite a trunnion at the inboard end with said forked end adapted for rigid connection to said blade, said spindle being dimensioned to fit within the yoke slot with the forked end passing on either side of the outboard end of said yoke, an elastomeric retention bearing located at the outboard end of said spindle within the yoke slot between said spindle and said yoke to carry the centrifugal loading of said blade and to serve as a pivot for blade lead-lag motion relative to a plane therethrough while permiting pitch change of said spindle and blade relative to said yoke, an elastomeric damper joining the inboard end of said spindle to said yoke for damping inplane motion of said blade with relatively less stiffness than out-of-plane motion thereof, and a beam-wise flexible plate inboard of said elastomeric damper and forming part of said yoke to accommodate blade flapping independently of said elastomeric retention bearing.

6. The combination set forth in claim 5 in which the portion of said yoke extending between said elastomeric bearing and said elastomeric damper is of a flexible plate character to permit flexure flapwise of said yoke between said elastomeric bearing and said elastomeric damper.

7. The combination set forth in claim 5 further including a cylindrical elastomeric member disposed about said trunnion and within said elastomeric damper for permitting pitch change of said spindle relative to said yoke.

8. The combination set forth in claim 5 wherein said elastomeric damper comprises a rigid bridge on each side of said yoke extending across said slot in the region of said trunnion with an elastomeric pad bonded between each said bridge and said trunnion for absorbing inplane motion of said spindle as shear forces on said elastomeric pads.

9. The combination set forth in claim 5 wherein said elastomeric bearing comprises
(a) a first load-bearing plate rigidly connected to said spindle and having a spherical surface facing outboard,
(b) a spherical elastomeric element bonded to the spherical surface of said first load-bearing plate,
(c) a compression plate having a spherical surface inboard and a conical surface outboard, the outboard surface of said spherical elastomeric member bonded to the spherical surface of said compression plate,
(d) a conical elastomeric element bonded on the inboard surface thereof to the conical surface of said compression plate, and
(e) a second load-bearing plate rigidly connected to the outboard end of said yoke and having a conical surface inboard bonded to the outboard surface of said conical elastomeric member.

10. Apparatus for coupling a helicopter rotor blade to a yoke mounted on a rotatable mast, comprising:
said yoke including an elongate opening therein;
a blade grip having a bifurcated outboard end secured to the rotor blade and an inboard end disposed within the yoke opening;

retention bearing means connected between the outboard end of said blade grip and said yoke for transferring centrifugal blade loads to said yoke while accommodating blade pitch and lead/lag motion substantially in a plane through said first bearing means; and bearing/damping means connected between the inboard end of said blade grip and said yoke for accommodating blade pitch and lead/lag motion while damping the lead/lag motion out-of-plane with relatively greater stiffness than the in-plane motion;

said yoke being adapted with a predetermined flexure zone adjacent said second bearing means for accommodating blade flap independently of said first and second bearing means.

11. The apparatus of claim 10, wherein said retention bearing means comprises:
a first rigid plate secured to said blade grip and having a substantially spherical surface facing outboard;
a second rigid plate secured to said yoke and having a substantially conical surface facing inboard;
a first elastomeric element with substantially spherical surfaces bonded to said first plate;
a second elastomeric element with substantially conical surfaces bonded to said second plate; and
a rigid insert with mating surfaces bonded between said first and second elastomeric elements.

12. The apparatus of claim 10, wherein said bearing-/damping means comprises:
an annular elastomeric bearing including a housing bonded to elastomeric and rigid elements bonded to said blade grip;
a pair of bridge members transverse to said blade grip and secured to said yoke;
elastomeric shear pads bonded between said bridge members and the housing of said annular bearing; and
stop means for limiting in-plane lead/lag motion of said blade grip.

13. The apparatus of claim 10, wherein the inboard end of said blade grip is of substantially circular cross-section tapering from the outboard end to the inboard end.

14. In an apparatus for coupling a rotor blade to a yoke on a rotatable mast of the type wherein the yoke includes an elongate opening and is adapted to flex flapwise thereby accommodating blade flapping, the improvement comprising:
a blade grip having a bifurcated outboard end secured to the rotor blade and an inboard end disposed within the yoke opening;
the inboard end of said blade grip being tapered;
first elastomeric bearing means connected between the outboard end of said blade grip and said yoke for transferring centrifugal blade loads to said yoke while accommodating blade pitch about a control axis extending through said blade grip and blade lead/lag motion relative to a plane extending through said first bearing means;
second elastomeric bearing means connected between the inboard end of said blade grip and said yoke for accommodating blade pitch and lead/lag; and
means connected between said second elastomeric bearing means and yoke for damping in-plane blade lead/lag in shear and for damping out-of-plane lead/lag in compression.

* * * * *